3,796,793
PRODUCTION OF FINELY DIVIDED
SOLID MATERIALS
Abraham Metzer, Ettore Basevi, and Avraham M. Baniel, Haifa, and Chanoch Gorin, Kiryat Bialik, Israel, assignors to Israel Mining Industries-Institute for Research and Development, Haifa, Israel
Filed Feb. 18, 1971, Ser. No. 116,589
Claims priority, application Israel, Mar. 16, 1970, 34,081/70
Int. Cl. C01f *17/00*
U.S. Cl. 423—263      10 Claims

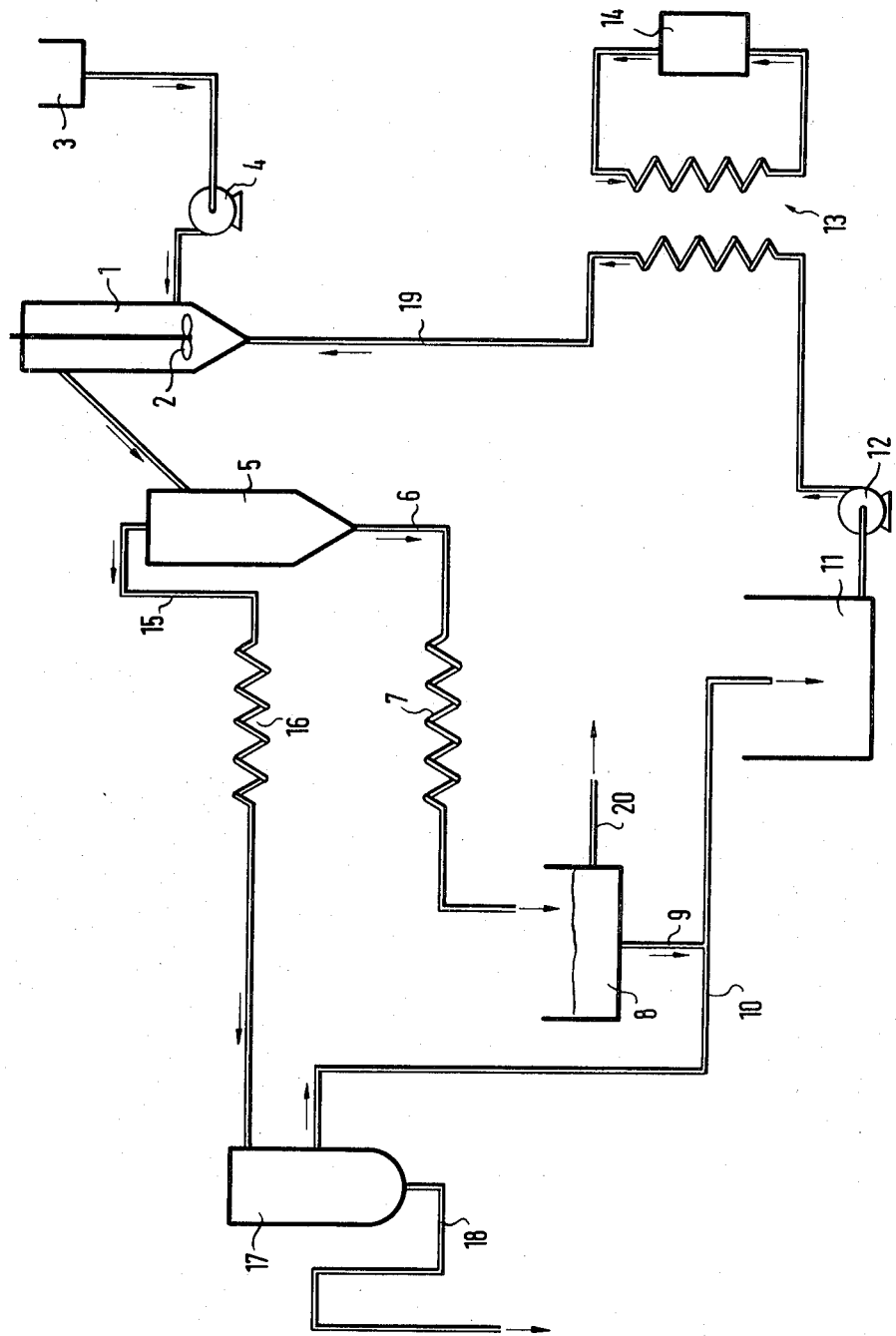

ABSTRACT OF THE DISCLOSURE

Solid material in finely divided, active form is prepared by contacting an aqueous dispersion of at least one substance with an inert organic compound acting as heat carrier and heated to a temperature of at least 100° C. higher than that of the dispersion. There forms a dispersion of finely divided solid material in the heat carrier from where the solid material is recovered. The aqueous dispersion and heat carrier may be contacted by injecting them continuously and simultaneously into a reaction chamber.

---

The present invention concerns a method for producing solid material in a finely divided powderous and active form. The term "active" connotes a state in which the given solid material is capable of participating readily in chemical reactions, e.g. solid-solid reactions, or of physical phenomena such as adsorption, catalysis and the like.

The invention is concerned both with the conversion of a given material into a finely divided active form without any chemical change, as well as to the chemical conversion of a substance or a mixture of substances to yield a desired conversion product or a mixture of products in finely divided active form.

The finely divided active products obtained in accordance with the invention are valuable materials applicable in various fields, e.g. as pigments, fillers, catalysts and adsorbents, starting materials for carrying out solid state reactions. These are merely examples and many other uses are envisaged.

Various methods are known for the production of fine powder. In accordance with one method, the desired material is ground in the solid state with adequate mechanical mills, such as ball mills, disc pulverizers, etc. With these machines it takes a very long milling time to achieve micron sizes. Moreover, they produce a wide range of different particle sizes from which the desired fine fraction has to be separated. This classification operation is very difficult and inefficient. A further limitation of this method is the introduction of impurities in the product originating from the bodies used in grinding.

By another known method, jet pulverizers are employed. Jet pulverizers are based on grinding particles by impact within themselves, occurring in a high-speed jet of the material in a propellant gas. In this method, contamination is less than in the mechanical grinding, since the grinding is autogeneous. However, like in the mechanical grinding method, the product is obtained in a wide range of different particle sizes and thus remains the problem of classification in order to separate a fraction with a desired particle size.

Neither by mechanical grinding nor by jet pulverization is it possible to obtain particles of a size much below 1 micron.

There further exist the so-called decrepitation and thermal shock methods which are based on thermal expansion or contraction of solids, and although theoretically feasible, have no practical application.

It is also known to produce finely divided $CaSO_4$ by dissolving the compound in fused NaCl and rapidly cooling this solution whereupon very fine $CaSO_4$ precipitates. The NaCl which also solidifies is leached out with water and the fine $CaSO_4$ is recovered as product. Presumably, this method could also find application to other material, but the particle size of the powders produced cannot be accurately controlled, and there thus remains again the problem of classification. Other drawbacks of this method are the necessity of special materials of construction to contain the molten salt, as well as the high process costs.

Yet another method consists in spray-drying of solutions. This method is used in practice to produce fine powdered materials, but the size of the particles obtained is in the range of several microns, i.e. about one order of magnitude larger than the powders which are to be produced in accordance with the present invention.

A very important prior method from an industrial point of view is the precipitation from solutions. By this method it is possible to produce very fine powders, especially pigments and fillers used in the paint and plastic industries, and it enables particles to be obtained in the range of from 0.5 micron up to several microns. One of the problems inherent in this method is that after precipitation the particles have to be thoroughly washed from ions entrained and adsorbed from the solution, which is difficult to achieve. Also the drying of these fine powders presents special problems, due to agglomeration and occasional crystal growth during the drying operation.

A recent addition to the known methods of producing fine powders consists in the use of a plasma flame. This method is based on spraying a molten material into a plasma flame or carrying out a chemical reaction in such flame, with resulting production of a fine powder. Typical examples are the reactions between $SiCl_4$ and $O_2$ to give very finely divided $SiO_2$, and between $TiCl_4$ and $O_2$ to give very finely divided $TiO_2$. The main problem of this method is that the fine powders are obtained at very high temperatures which causes a loss of reactivity notwithstanding the small particle size. A further drawback is the fact that the method is relatively expensive.

It has further been reported recently that finely divided aluminum oxide suitable for use as a catalyst base is obtainable by hydrolysis of an aluminium alcoholate in an organic solvent solution under reflux.

Yet another prior method for the production of finely divided solid material is the so-called freeze drying of solutions, also known as the cryochemical method. This method is relatively new and apparently not yet used industrially. It consists of first producing small frozen drops of a solution of a metal salt by spraying the solution in hexane at below 0° C., and then recovering the frozen drops and subjecting them to vacuum drying. Allegedly, it is possible to produce in this manner oxides of high specific surfaces. However, this method can only be used for special purposes, since it is very expensive.

A still further known method for the production of finely divided elementary metals or their oxides consists in the thermal decomposition of metal carbonyls. This method is inherently limited to a small number of metals capable of carbonyl formation, such as Fe, Co and Ni.

Finally, there is also known the hydrolytic decomposition of salts in aqueous solution by contact with hot combustion gases at a temperature of at least 600° C. This so-called Aman process is used industrially for the decomposition of metal chlorides. Among the drawbacks of this mehod there may be mentioned the high temperatures needed for good thermal efficiency, the fact that the powders obtained are of low reactivity and the fact that the hydrochloric acid produced is mixed with large volumes of combustion gas and water vapour, which renders its recovery difficult.

It is thus seen that all known processes for the production of finely divided solid material are not quite satisfactory for one or more of the following reasons:

1. Impossibility to control the particle size of the product which makes subsequent classification necessary.
2. The particles obtained are too large.
3. Insufficient purity of the product.
4. Insufficient activity of the product.
5. High operational costs and a high capital investment.
6. Inherent limitation to a few materials.

In view of the above, it is the object of the present invention to provide an improved process for the production of a solid material in finely divided active form, the term "material" connoting either a single compound or a mixture of compounds.

In accordance with the invention there is provided a process for the production of a solid material in finely divided active form, comprising contacting an aqueous dispersion of at least one substance, with an inert organic compound heated to a temperature at least 100° C. higher than that of said aqueous dispersion, recovering a suspension of the desired finely divided product in said organic compound and separating the product from said suspension.

One of the functions of the organic compound is to act as heat carrier and it will therefore be referred to hereinafter for short as "heat carrier." As a rule its temperature does not exceed 400° C.

If desired, the heat carrier remaining after the separation of the product may be recycled.

The product may be one single compound or a mixture of compounds and the term "product" used herein is deemed to refer to either case.

The term "aqueous dispersion" is meant to include true or colloidal aqueous solutions as well as aqueous gels, all of which may also include minute solid particles suspended therein.

The stipulation that the heat carrier must be inert means that it must not react with any of the materials dispersed in the water nor with any product released from the aqueous dispersion, and must have a satisfactory thermal stability. The compounds should, moreover, be non-corrosive and have a high boiling point. Preferably, the compounds should be non-polar although in some cases the presence of weakly polar groups may be permissible. Examples of such compounds are long-chain paraffinic hydrocarbons, halogenated hydrocarbons, ethers, cycloparaffins.

When it is desired to confer special surface properties to the product, surface active agent may be incorporated in the heat carrier, which surface active agent is then adsorbed on the surface of the freshly produced particles. For instance, if the powder produced is to be used as an oil dispersible pigment, it should preferably have a hydrophobic surface. To this end, a surface active agent such as a fatty acid or a long chain sulfonate will be incorporated in the heat carrier and be adsorbed therefrom on the formed particles to confer on them hydrophobic properties.

The heat carrier fed to the process may be in liquid or vaporous phase. In the latter case the vaporous heat carrier condenses in the course of the process. In either case there forms a suspension of the product in the liquid heat carrier from which the product is then separated by any of the conventional solid-liquid separation methods. For purifications, the finely divided product may be washed with a low-boiling solvent and subsequently heat-dried, if desired, in vacuo.

It has been found that the solid products obtained in accordance with the invention have a relatively uniform particle size within a relatively narrow range in which the largest particles may be 3–10 times larger than the smallest. The sizes of the particles obtained in accordance with the invention are in many cases within the specific surface range of 5–300 $m^2/g$. The absolute particle sizes in a given product depend on the chemical nature thereof and the conditions of the treatment, such as the temperature gradient and time of contact between the aqueous dispersion and the heat carrier. All these factors are fully controllable and, therefore, by a proper selection of conditions it is possible in accordance with the invention to control the particle size of the products within the range of less than 0.01 micron to several microns.

It should be noted that the above indications of the ratio between the sizes of the largest and smallest particles and of the specific surface range pertain to the primary product obtained in accordance with the invention. Where such a primary product is further processed both the absolute size and the size distribution may change.

It is believed that the effect achieved in accordance with the invention is due mainly to the combination of two factors, namely:

(a) The thermal shock resulting from the contact between the relatively cool aqueous dispersion and the relatively hot heat carrier;
(b) A coating consisting of the heat carrier produced on the solid particles which prevents their further growth.

The heat carrier thus fufils a double function of a direct-contact heat transfer medium and of a crystal growth and agglomeration inhibitor.

The following explanation of the phenomena occurring in the reaction is suggested without limiting the invention in any way:

The aqueous dispersion comes in the reaction zone in sudden contact with the heat carrier at a temperature higher than that of the aqueous phase and thereupon a very quick vaporization of water takes place. A cold drop of solution coming in contact with hot heat carrier vapors is first heated, with consequent evaporation of water through the surface. As a result of this evaporation the concentration of salt in the whole drop increases by virtue of the strong convection currents within the liquid. These convection currents cause also an increase in temperature in the whole drop. When supersaturation of salt is reached, small crystallites are precipitated from the solution over the whole mass of the drop. Once a solid phase is formed within the drop (the solid phase having an extremely high specific surface), water vapors nucleated on the surfaces escape from the overheated solution. This escape is extremely rapid, and the vapor expands against an opposing force represented by the surface tension of the drop, so that an explosive disintegration takes place. As a result of this disintegration the small crystals present are individually projected out of the zone in which the aqueous dispersion and the heat carrier first came into contact into a colder zone where they are immediately coated by the heat carrier thus preventing them from further growth. Such immediate coating is due to the high activity and hence high adsorption capacity of the produced particles, which activity is retained due to the coating.

Preferably, the aqueous dispersion is introduced into the process at room temperature. However, there may be cases of materials that are not readily water-dispersable, so that for the production of a reasonably concentrated aqueous dispersion the latter has to be at a temperature of above room temperature. There may also be cases where the aqueous dispersion is cooled to below room temperature prior to being fed into the process according to the invention.

Also it was found that the higher the concentration of metal salt in the aqueous feed solution, the smaller the particle size of the resulting powder. For instance, from a solution of iron acetate with a concentration of 10 g./l., fine particles obtained have a mean particle size of 155 A., whereas with a concentration of 60 g./l. the mean size of the fine particles is 92 A. Therefore, in order to obtain the smallest possible particles, use of very concentrated solutions might be necessary. Since for most metallic salts the solubility increases with rise in temperature, the aqueous solution might be prepared and fed to the apparatus at a temperature higher than ambient temperature, and in some cases the solution temperature might be close to its boiling point. A further increase in the temperature of the aqueous solution may be obtained by raising the working pressure.

In accordance with a preferred embodiment of the invention the aqueous dispersion and heat carrier are contacted by injecting them simultaneously into a reaction chamber. Preferably the rates of injecting of the aqueous dispersion and heat carrier and the temperature are so selected that the specific surface of the product is within the range of 5–300 m.$^2$/g. Also preferably, the aqueous dispersion is injected in the form of thin drops, e.g. by spraying.

It has already been known before to use organic compounds for direct-contact heat transfer for various technological applications (see, for example, applicants' British Pats. Nos. 830,738 and 1,080,661 as well as their U.S. Pat. No. 3,337,421). It has, however, never been suggested to use this method for the production of solid materials in finely divided active form. Moreover, it was not to be expected that a direct heat transfer to an aqueous dispersion by means of a heat carrier may be applicable for the precipitation of solids aqueous solution, and one would have expected to obtain in this way a ternary system of heat carrier, solid material and water, in which the solid material would have been expected to agglomerate and to form large size and possibly hydrated crystals. It was, therefore, surprising to find in accordance with the invention that under the specific conditions specified the solid material is obtained in form of small size active particles having a high degree of uniformity.

The fact that the invention was surprising and could not have been expected is also not influenced by the prior knowledge that certain salts can be decomposed in a shock-like treatment by contacting their aqueous solutions with hot combustion gases in the so-called Aman process referred to hereinbefore. The shock treatment in a so-called Aman process requires as a rule much higher temperatures exceeding 600° C. as compared to temperatures below 400° C. applied in the process according to the invention. In consequence of the high temperature prevailing in a so-called Aman process the initially formed particles agglomerate due to sintering, which agglomeration is not prevented by the inert combustion gases. Against this in accordance with the invention no agglomeration occurs because of the much lower temperature and the inhibition of crystal growth effected by the organic heat carrier. Thus the products of a so-called Aman process have larger particle size then those obtained in accordance with the invention and are of reduced activity and it was surprising and completely unexpected that by utilizing among others a thermal shock treatment at a substantially lower temperature under the specific conditions of this invention, fine particulate materials are obtained with smaller particle size and a much higher state of activity.

The products obtained in accordance with the invention are highly superior to similar products obtained by any of the conventional processes, both as regards activity and uniformity, and at the same time are obtained with the application of less energy and/or operational costs than in the case of the conventional processes. The present invention thus constitutes a considerable advance in the art of producing solid materials in finely divided active form.

In accordance with one embodiment of the invention, a given compound is converted into a fine powder without any chemical change. In carrying out this embodiment, the desired substance is dispersed in water and the resulting aqueous dispersion is further treated as specified. If desired, a powder consisting of a mixture of two or more different substances in a desired relative proportion may be produced in this matter from an aqueous dispersion containing the substances in the desired relative proportion.

One application of this embodiment concerns the recovery of a product resulting from a chemical reaction in aqueous solution, in a finely divided state. Where the conditions of precipitation of the product from the aqueous mother liquor are so selected as to produce the product in the desired state of division there may result a finely dispersed, stable aqueous suspension from which the recovery of the product by filtration and washing is difficult if not impossible. When in such cases the conditions of precipitation are so selected as to produce a filtrable product, the particles may be too coarse for the desired purpose. In accordance with the present invention this difficulty is resolved by using the above stable aqueous suspension as feed for contact with a heat carrier in the manner specified. It should be noted that in this application of the invention the substance that is treated is the precipitate from the aqueous solution while the preceding chemical reaction does in this case not form part of the process according to the invention.

In accordance with another embodiment of the invention, the substance in the aqueous feed dispersion undergoes decomposition upon contact with the heat carrier and the finely divided active material obtained is the product of such decomposition. Thus, in accordance with this embodiment, an aqueous feed dispersion of the heat decomposable substance is first prepared and is then submitted to further treatment as specified. Thus in accordance with this embodiment the chemical decomposition does form part of the process according to the invention. Also in this embodiment, it is possible to disperse in the feed dispersion two or more different substances in a desired relative proportion and thereby to obtain as product an intimate mixture of two or more different materials present in the mixture at a predetermined relative proportion.

The invention may, for example, be employed for the preparation of reaction mixtures for solid state reactions. For example, it is possible, in accordance with either of the above two embodiments, to produce fine solid dispersions with particle sizes of from 50–200° A., which are in general amorphous, which when heated at relatively low temperatures, undergo further reaction to give the desired compound. The temperatures needed to bring about and complete the solid state reaction of such dispersions produced in accordance with the invention are much lower than those necessary when the starting materials are mixed in the conventional manner, e.g. by grinding them together for a relatively long time. For example, for the manufacture of ferrites a mixture of $Fe_2O_3$ with another metal oxide, e.g. MgO or MnO, is prepared in accordance with the invention and is then heated at a temperature of about 400° C. whereupon the desired ferrite-forming reaction proceeds to completion. Against this, similar mixtures produced in the conventional way, e.g., $MgO$—$Fe_2O_3$ or $MnO$—$Fe_2O_3$, have to be heated at 900–1000° C. in order to produce the same ferrites.

Either of the above two embodiments may serve for the preparation of various other valuable products and mixtures, such as coated powders, solid catalysts, adsorbents, doped oxides for the manufacture of gems, electronic ceramics (semi-conductors, etc.), glazes, glasses, etc.

When a mixture of two or more solid materials obtained in accordance with the invention is further processed by sintering this may be done in a controlled atmosphere, e.g. a reducing atmosphere.

The enclosed drawing is a flow-sheet of an installation for carrying out the invention on a large scale.

The installation illustrated comprises a reactor 1 with an impeller 2. The reactor 1 is constantly fed with an aqueous feed dispersion from a container 3 by means of a pump 4, and simultaneously with a preheated liquid hydrocarbon serving as heat carrier and arriving through a line 19. The formation of the solid in finely divided active form occurs inside reactor 1 and a ternary mixture of stream, hydrocarbon and solid particulate material is discharged into a separator 5. From the latter, a liquid hydrocarbon fraction with suspended solid particulate material therein is withdrawn through line 6 and conducted through a cooler 7 into a filter 8. From the latter, the product is withdrawn through line 20 while liquid hydrocarbon is withdrawn through line 9 and conducted through line 10 into a hydrocarbon reservoir 11. From the latter, the hydrocarbon is pumped by means of a pump 12 through a heat exchanger 13 where it is preheated by indirect heat exchange with a heat transfer liquid which in turn is heated in a boiler 14, and the so-preheated hydrocarbon is flown back through line 19 into reactor 1 as specified.

From the top portion of separator 5 there escapes a vaporous phase comprising steam, some entrained hydrocarbon and volatile decomposition products, if any. The escaping mixture is conducted through a condenser 16 into a separator 17 where phase separation into an upper hydrocarbon phase and a lower aqueous phase occurs. The former is withdrawn through line 10, combined with the hydrocarbon arriving from the filter 8 and conducted together with the latter into the hydrocarbon reservoir 11, from where it is further cycled as specified.

The aqueous phase withdrawn through line 18 is processed for the recovery of any decomposition products.

The arrangement in the above installation is for the case where the organic phase is lighter than water. There may, however, be other cases where the organic phase is the lower, heavier one, e.g. where a polyhalogenated aliphatic hydrocarbon is used as heat carrier. Obviously, the use of said heavy heat carriers is also within the scope of the invention.

The invention is further illustrated by the following examples to which it is not limited. In some of the examples a primary product is subjected to further thermal treatment. In some of such cases the particle size of the primary product was not established exactly and is, therefore, not indicated. In all these cases the specific surface of the primary product was within the range of 5–300 $m.^2/g.$

EXAMPLE 1

Preparation of powdered NaCl

An aqueous solution containing 250 g./l. of NaCl was fed into a reactor vessel at a rate of 7 l./h. together with a petroleum fraction boiling between 260 and 280° C. at a rate of 380 l./h. The temperature in the reactor was maintained at 260±5° C. Water evaporated from the reactor zone and the vapor with some entrained hydrocarbon was withdrawn, condensed and collected. A slurry of finely divided sodium chloride in the petroleum was withdrawn from the reactor and filtered. The solid finely divided product was washed with petroleum ether free of any hydrocarbon and then dried at 100° C. The specific surface of the sodium chloride obtained in this way was found to be 6 $m.^2/g.$, which corresponds to a mean particle size of $0.5\mu$.

If the conventional method of grinding either in a ball mill, by a jet pulverizer or any other mechanical method, is used, the same particle size can be obtained only after very long grinding periods, of the order of days, and extreme conditions of dryness, to avoid making and agglomeration. In some cases it might be necessary to add special surface active agents to permit grinding to such a size. Besides these inconveniences, the purity of the material is affected by erosion of the grinding machine.

As already mentioned, the results according to the invention are due to the combined effect of heat shock and direct contact with a liquid heat carrier. In order to illustrate this, the following experiment was made:

An aqueous solution containing 250 g./l. of NaCl was emulsified in oil and the resulting emulsion was heated slowly in a flask to 260° C. The aqueous phase was distilled off and recovered by means of a condenser. The solids remaining in the paraffin were filtered off, washed with benzene and dried at 150° C. NaCl obtained consisted of particles in the size range of 10–30$\mu$, i.e. they had a particle size of from 20 to 60 times larger than those obtained in accordance with the above exemplified process according to the invention.

EXAMPLE 2

Preparation of powdered Mg(OH)Cl

An aqueous solution containing 200 g./l. of $MgCl_2$ was treated in a manner similar to that described in Example 1. The feeding rates were 380 l./h. for the petroleum and 6 l./h. for the aqueous solution. The temperature in the reactor was maintained at 270±5° C. Water and HCl were obtained in the condensate. The fine solids were recovered, analysed and found to contain 31.6% Mg. and 46.2% Cl, which indicates that the product was Mg(OH)Cl. The mean particle size was $0.1\mu$.

EXAMPLE 3

Preparation of powdered $Fe_2O_3$

A solution of ferric acetate containing approximately 50 g./l. $Fe^{+++}$ was fed into a reactor at a rate of 5 l./h. together with a paraffinic petroleum fraction boiling at 300° C. at a rate of 370 l./h. The temperature in the reactor was kept at 280±5 C. In the reactor the ferric acetate underwent hydrolysis as a result of which acetic acid was distilled off together with water. The distillate was condensed and the resulting aqueous acid together with some entrained paraffin oil was collected.

The product was worked up as in Example 1, the drying being effected at 70° C. It consisted of fine powdered $Fe_2O_3$ having a specific surface of 250 $m.^2/g.$ and its X-ray diffraction pattern showed several weak lines characteristic of the gamma ferric oxide variety. By heating to 400° C., this powder was transformed into well-crystallized gamma ferric oxide.

EXAMPLE 4

Preparation of powdered $SiO_2$

An aqueous suspension of 15 g./l. of hydrolytic $SiO_2$ obtained by dropping $SiCl_4$ in water was fed dropwise into a reactor at a rate of 1 l./h. together with paraffin oil (B.P. 300° C.) at a rate of 30 l./h. The temperature in the reactor was maintained at 220° C. The solid product was worked up as described in Example 1, and had a specific surface of 150 $m.^2/g.$, which corresponds to a particle size of $0.015\mu$.

EXAMPLE 5

Preparation of powdered $TiO_2$

From an aqueous solution of titanium glycerolate, containing 20 g./l. Ti, powdered $TiO_2$ was produced by employing a procedure similar to that described in Example 3. The product obtained was calcined in air at 800° C., whereupon it turned brilliant white and had a specific surface of 30 m.²/g., which corresponds to a mean particle size of 0.04μ.

EXAMPLE 6

Preparation of magnesium ferrite powder

A mixed aqueous solution of Fe and Mg acetates containing 4.0% by weight of Fe and 2.34% by weight of Mg was fed at a rate of 5 l./h. into a reactor together with liquid paraffin oil and at a rate of 350 l./h. the temperature in the reactor being maintained at 300° C. The working up was as in the previous examples. After washing with petroleum ether, the product was dried at 70° C. at subatmospheric pressure. The X-ray diffraction pattern of the solid product did not show crystallinity and appeared amorphous. However, after one hour heating at 400° C., the X-ray diffraction pattern revealed the existence of crystalline magnesium ferrite $MgFe_2O_4$ as the only phase present, with a mean particle size of 0.25μ.

EXAMPLE 7

Preparation of spinel-$MgAl_2O_4$

A feed solution containing 56 g./l. $MgCl_2$ and 157 g./l. $AlCl_3$ was processed in a manner similar to that described in Example 3, the temperature in the reactor being 300° C. The distillate consisted of aqueous HCl with some entrained paraffil oil. The solids obtained consisted of $Mg(OH)Cl$ and $Al_2O_3$ in a mutually highly dispersed state. This material was then heated at 600° C. for one hour, whereupon HCl evolved. The X-ray diffraction pattern of the resulting product showed only the presence of the cubic spinel form of $MgAl_2O_4$. The specific surface of this material was 2 m.²/g., which corresponds to a mean particle size of 1μ.

EXAMPLE 8

Production of lithium ferrite powder

From a feed solution containing 12 g./l. of lithium acetate and 325.6 g./l. of ferric acetate processed and worked up as in Example 6, and heating the product for one hour at 400° C., there was obtained cubic $Li_{0.5}Fe_{2.5}O_4$, as established by X-ray diffraction, with an average particle size of 0.15μ.

EXAMPLE 9

Production of barium Titanate—$BaTiO_3$

An aqueous feed solution containing barium acetate and titanium glycerolate in quantitites corresponding to 27.5 g./l. Ba and 10 g./l. Ti was introduced into a reactor at a rate of 1 l./h. together with paraffin oil (B.P. 300° C.) at a rate of 30 l./h. The temperature in the reactor was kept at 200±5° C. Acetic acid, glycerol, water and some paraffin oil were distilled off and collected. The slurry found in the reactor was cooled to 100° C. and centrifuged. The separated solids were washed with petroleum ether on a vacuum filter and then dried at 70° C. The dry solid product was heated at 700° C. in air for 60 minutes and turned into $BaTiO_3$ having a specific surface of 54 m.²/g.

EXAMPLE 10

Production of fine mullite—$3Al_2O_3 \cdot 2SiO_2$

A feed solution containing tetramethyl ammonium aluminate and tetraethyl ammonium silicate in quantities corresponding to 29 g./l. Al and 10 g./l. Si was fed into a reactor at a rate of 1 l./h. together with a paraffinic petroleum fraction (B.P. 300° C.) at a rate of 30 l./h. The temperature in the reactor was kept at 300° C. and the tetra alkyl ammonium hydroxides were distilled off together with water. Working up was as in the previous examples. The resulting product was heated at 800° C. for one hour and was then established to be mullite by X-ray diffraction. The specific surface was 10 m.²/g. which corresponds to a mean particle size of 0.2μ.

EXAMPLE 11

Production of yttrium-iron garnet—$Fe_2(Y_3Fe_3)O_{12}$

The feed solution contained ferric acetate and yttrium acetate in quantities corresponding to 41.9 g./l. Fe and 40 g./l. Y. The procedure was as in Example 6. The fine solids obtained had a particle size of 200 A. Upon heating for one hour at 500° C., the above garnet was obtained, as established by X-ray diffraction.

EXAMPLE 12

Preparation of hexagonal barium ferrite—$BaFe_{12}O_{19}$

The aqueous feed solution contained ferric acetate and barium acetate in quantities corresponding to 3.77% by weight of Fe and 0.77% by weight of Ba. The procedure was as in Example 6. The fine solids had a particle size of 100–200 A. The product was heated at 800° C. for one hour, whereupon the above ferrite was obtained as determined by X-ray diffraction. The specific surface of the product was 11 m.²/g.

EXAMPLE 13

Production of iron-coated clay powder

This example illustrates the coating of an inert powder with an active coat.

10% by weight of finely ground china clay (inert material, particle size—325 mesh) were suspended in 1 litre of an aqueous ferric acetate solution conaining 10 g./l. of Fe. This suspension was processed as described in Example 6. The resulting solid material was washed with petroleum ether and dried at 70 °C. The product thus obtained was calcined at 400° C. and a bright red powder, useful as a pigment, was obtained.

EXAMPLE 14

Preparation of active alumina

A solution of aluminium acetate containing 20 g./l. of Al was decomposed in a manner similar to that described in Example 6. The product was washed with petroleum ether, dried at 70° C. and then calcined at 300° C. In this way active $Al_2O_3$ having a specific surface of 250° m.²/g. was obtained. This material had a capacity of adsorbing gases and vapours as shown in the following table:

| Gas or vapour | Amount adsorbed at saturation, percent by wt. | T—25° C. |
|---|---|---|
| $H_2O$ | 34 | |
| $CH_3OH$ | 22 | |
| $CO_2$ | 13 | |

EXAMPLE 15

Preparation of a catalyst effective for hydrogenation of olefins

An aqueous feed solution containing aluminum acetate and nickel acetate in quantities corresponding to 15 g./l. Al and 1.5 g./l. Ni was treated in a manner similar to that described in Example 6. The solid product was washed with petroleum ether and dried at 70° C. The dry material was subjected to a treatment with hydrogen at 500° C., by which the nickel oxide contained in the solid was reduced to metallic nickel. The specific surface of the product was approximately 200 m.²/g.

EXAMPLE 16

Preparation of alumina nutrient for ruby growing

A free flowing alumina ($Al_2O_3$) powder doped with chromium and suitable as nutrient for growing ruby crystals by the Verneuil method, was produced from a freshly prepared aqueous solution of aluminum acetate and chromium acetate, containing 20 g./l. of Al and 0.2 g./l. of Cr. The procedure was as described in Example 10. After washing with petroleum ether and drying, the fine powder obtained had a particle size of 90–150° A. This product was then calcined for one hour at 800° C. and the desired nutrient product resulted.

EXAMPLE 17

Preparation of $\gamma$-$Fe_2O_3$ containing cobalt

A solution of ferric and cobalt acetate containing approximately 60 g./l. $Fe^{+3}$ and 9 g./l. $Co^{+2}$ was fed into a reactor together with a paraffinic petroleum fraction boiling at 300° C. The temperature in the reactor was kept at 280°±5° C. In the reactor the working up was as mentioned in Example 3.

The product conisted of fine-powdered $Fe_2O_3$ containing cobalt having a specific surface of 200 m.²/g. and its X-ray diffraction pattern showed several weak lines characteristic of gamma ferric oxide. By heating to 400° C., this powder was transformed into well crystallized gamma ferric oxide containing cobalt.

EXAMPLE 18

Production of lithium ferrite powder doped with calcium

A feed solution containing 10 g./l. calcium acetate, 12 g./l. lithium acetate and 330 g./l. of ferric acetate were processed and worked up as in Example 6. On heating the product to 400° C. for one hour there was obtained a cubic $Li_{0.5}Ca_{0.1}Fe_{2.35}O_{3.875}$, as established by X-ray diffraction, with an average particle size of 0.25 micron.

EXAMPLE 19

Preparation of powdered $\gamma$-$Fe_2O_3$

Ferric hydroxide (or hydrated oxide) was precipitated by adding a concentrated ammonia solution to a cold solution of ferric acetate containing approximately 20 g./l. $Fe^{+++}$. The cold gel formed was fed at a rate of 1 l./h. into a reactor vessel (kept at 270±5° C.) together with a boiling paraffinic fraction (B.p. 300° C.) at a rate of 30 l./h. thus resulting in a sudden evaporation due to the thermal shock. In the reactor the solution was vaporized, as a result of which ammonium acetate was distilled off together with excess ammonia and water, while the ferric oxide remained in suspension in the paraffin.

The product was washed and dried as in Example 1, and heated to 400° C. The powder obtained was examined by X-ray diffraction and found to be gamma ferric oxide, it had a specific surface of 65 m.²/g.

When the same experiment was repeated without thermal shock (the gel being mixed with the paraffinic fraction and heated at 270° C. to distil off the water and the product being treated as above) the powder obtained was gamma ferric oxide having a specific surface of 5 m.²/g.

We claim:

1. A process for the production of a solid inorganic metal hydroxy salt or metal oxide including silicon containing salt or oxide in finely divided active form, comprising:

providing an aqueous dispersion consisting essentially of water and at least one substance capable of yielding said solid inorganic metal hydroxy salt or metal oxide in particulate form;

preheating a noncorrosive, high boiling inert organic heat carrier to a temperature of at least 100° C. higher than said aqueous dispersion but no greater than 400° C., said heat carrier being a liquid or condensable vapor;

contacting said aqueous dispersion with said preheated organic heat carrier to effect rapid evaporation of all the water from said dispersion and simultaneously effect decomposition of said substance to yield said metal salt or metal oxide and, where the heat carrier is vaporous, to effect the condensation thereof;

recovering a suspension of the finely divided product in said heat carrier; and separating said product of highly uniform particle size having a specific surface area of 5–300 m.²/g. from said suspension.

2. Process for the production of a product containing at least one solid inorganic metal hydroxy salt or solid inorganic metal oxide including silicon containing salt or oxide in a finely particulate form, comprising:

(a) providing an aqueous dispersion which is a solution, colloidal solution, suspension or gel from a precursor of said solid product, which precursor is capable of chemical conversion by way of hydrolysis, dehydration or decomposition at an elevated temperature not exceeding about 400° C.;

(b) preheating a noncorrosive, high boiling temperature, inert heat carrier nonreactive with said solid product to a temperature which is at least 100° C. higher than said aqueous dispersion but not exceeding 400° C., said heat carrier being a liquid or condensable vapor selected from the group consisting of long-chain paraffinic hydrocarbons, halogenated hydrocarbons, ethers and cycloparaffins;

(c) contacting said aqueous dispersion with said preheated heat carrier to effect rapid evaporation of all the water from said dispersion and simultaneously therewith effect said chemical conversion and, where the heat carrier is in vaporous state, also the condensation thereof;

(d) recovering a suspension of said solid product in said heat carrier; and (e) separating said product of particle size having a specific surface area of 5–300 m.²/g. from said heat carrier.

3. A process according to claim 2, wherein the aqueous dispersion and heat carrier are contacted by injecting them simultaneously into a reaction chamber.

4. A process according to claim 3, wherein the aqueous dispersion is injected as a spray.

5. Process according to claim 2 wherein said aqueous dispersion contains at least one water-insoluble substance on which said product is deposited during the contact of the dispersion with said heat carrier.

6. Process according to claim 2 wherein a surface active agent stable under the operating conditions is admixed to said heat carrier.

7. Process according to claim 2 wherein said product comprises two metal oxides and the mixture is subjected to heat treatment to induce a solid state reaction.

8. Process according to claim 7 applied to the manufacture of a ferrite, comprising preparing as said product a finely divided mixture containing $Fe_2O_3$ and at least one other metal oxide and heating said mixture to produce the desired ferrite.

9. Process according to claim 7 applied to the manufacture of spinel, comprising preparing as said product a finely divided mixture containing $Mg(OH)Cl$ and $Al_2O_3$ and heating said mixture to produce the desired spinel.

10. Process according to claim 7 applied to the manufacture of yttrium-iron garnet comprising preparing as said product a finely divided mixture containing yttrium oxide and iron oxide and heating said mixture to produce the desired garnet.

References Cited

UNITED STATES PATENTS

| | | | |
|---|---|---|---|
| 3,378,335 | 4/1968 | Ellis et al. | 23—51 R |
| 3,337,421 | 8/1967 | El-Roy | 23—51 RUX |
| 3,236,747 | 2/1966 | Margeloff. | |
| 1,958,012 | 5/1934 | Muckenfuss. | |
| 3,290,122 | 12/1966 | Clinton et al. | |
| 2,151,990 | 3/1939 | Ruys | 423—659 |
| 3,645,672 | 2/1972 | Cowland | 423—594 |

FOREIGN PATENTS 830,738   3/1960   Great Britain.

HERBERT T. CARTER, Primary Examiner

U.S. Cl. X.R.

106—304; 252—62.63; 423—325, 327, 335, 497, 499, 592, 593, 594, 598, 600, 610, 630, 633, 659